(No Model.)
10 Sheets—Sheet 1.

A. A. RHEUTAN.
ENVELOPE MACHINE.

No. 401,462. Patented Apr. 16, 1889.

Fig. 1

WITNESSES:
Walter B. Nourse.
Lucius W. Briggs.

INVENTOR:
Abram A. Rheutan,
BY
A. A. Barker.
ATTORNEY.

(No Model.)    10 Sheets—Sheet 2.

A. A. RHEUTAN.
ENVELOPE MACHINE.

No. 401,462.    Patented Apr. 16, 1889.

WITNESSES:
Walter B. Nourse,
Lucius W. Briggs

INVENTOR
Abram A. Rheutan,
BY
A. A. Barker
ATTORNEY (No Model.) 10 Sheets—Sheet 3.

A. A. RHEUTAN.
ENVELOPE MACHINE.

No. 401,462. Patented Apr. 16, 1889.

WITNESSES:
Walter B. Nourse.
Lucius W. Briggs.

INVENTOR
Abram A. Rheutan
BY
A. A. Barker
ATTORNEY (No Model.) 10 Sheets—Sheet 4.

A. A. RHEUTAN.
ENVELOPE MACHINE.

No. 401,462. Patented Apr. 16, 1889.

Fig. 6.

WITNESSES:
Walter B. Nourse.
Lucius W. Briggs.

INVENTOR
Abram A. Rheutan,
BY
A. A. Barker,
ATTORNEY (No Model.)   10 Sheets—Sheet 7.

A. A. RHEUTAN.
ENVELOPE MACHINE.

No. 401,462.  Patented Apr. 16, 1889.

WITNESSES:
Walter B. Nourse.
Lucius W. Briggs.

INVENTOR
Abram A. Rheutan
BY
A. A. Barker
ATTORNEY (No Model.)  10 Sheets—Sheet 9.

A. A. RHEUTAN.
ENVELOPE MACHINE.

No. 401,462. Patented Apr. 16, 1889.

WITNESSES:
Walter B. Nourse,
Lucius W. Briggs.

INVENTOR
Abram A. Rheutan,
BY
A. A. Barker,
ATTORNEY

UNITED STATES PATENT OFFICE.

ABRAM A. RHEUTAN, OF WORCESTER, MASSACHUSETTS, ASSIGNOR TO WADE H. HILL, OF SAME PLACE.

ENVELOPE-MACHINE.

SPECIFICATION forming part of Letters Patent No. 401,462, dated April 16, 1889.

Application filed June 30, 1886. Serial No. 206,684. (No model.)

*To all whom it may concern:*

Be it known that I, ABRAM A. RHEUTAN, of Worcester, in the county of Worcester and State of Massachusetts, have invented certain new and useful Improvements in Envelope-Machines; and I do hereby declare that the following is a full, clear, and exact description of the same, reference being had to the accompanying drawings, forming a part of this specification, and in which—

All the figures following Fig. 7 are shown upon an enlarged scale to more fully illustrate my improvements.

This invention relates more particularly to improvements in the blank elevating, holding, gumming, and conveying or feeding mechanisms of an envelope-machine adapted to gum, fold, and count the envelopes; and it consists in the combination of certain elements for gumming and picking up the envelope-blanks, with certain elements for elevating the pile of envelope-blanks and for holding the top blank thereof in position while being gummed, as hereinafter described.

It also consists of improvements in the means employed for removing the gummed envelope-blanks from the picker and feeding or conveying the same back therefrom toward the folding mechanism; of improvements in the means employed for holding the blanks in position over the folder-box prior to the plunger of the machine descending to push them down into said folder-box; of improvements in the side-flap-gumming mechanism, and of improvements in the mechanism for removing and conveying the finished envelopes from the drying-chain to the counter-box of the machine, all as hereinafter more fully set forth.

The foregoing constitute the main or essential features of my invention. Others of minor importance will be understood from the following description and claims, taken in connection with the drawings.

To enable others skilled in the art to which my invention appertains to make and use the same, I will now proceed to describe it more in detail.

I will first describe independently and in detail the various mechanisms relating to my improvements hereinbefore referred to, after which the combined operation thereof will be set forth in a brief description of the operation of the whole machine.

Figure 1:
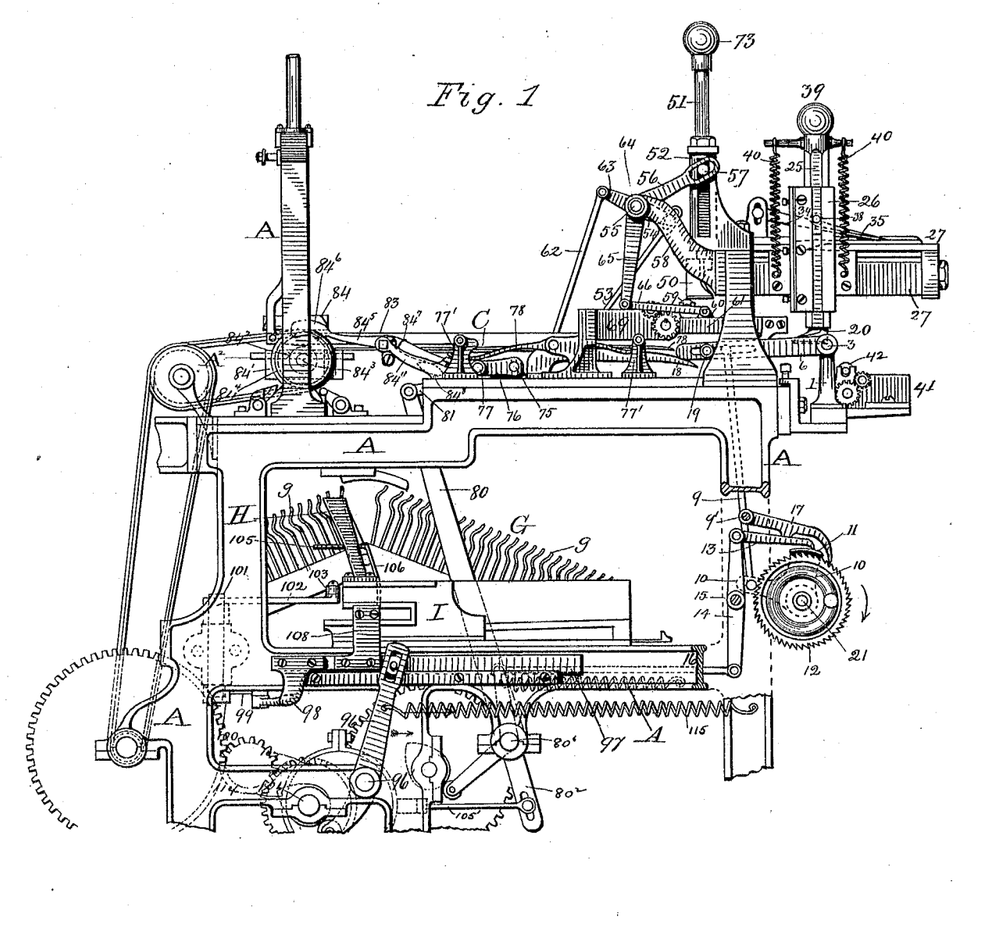
Figure 1 represents a front side view of so much of an envelope-machine as is necessary to illustrate my improvements thereon.
Figure 5:
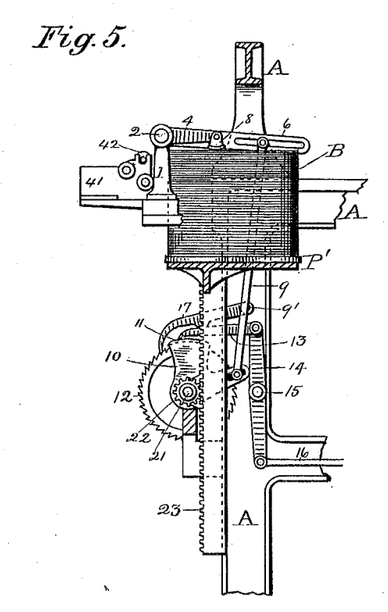
Fig. 5 is a back side view of the blank-supporting table and the feed mechanism for elevating the pile of blanks to the proper height for removing the top blank therefrom, as hereinafter described.

The mechanism for feeding up the blank-elevator, upon which the pile of envelope-blanks is placed, and for holding the top blank in position while its front flap is being gummed, work in combination, one with the other, and are constructed and arranged to operate in the following manner:

Upon the frame A of the machine are secured two bearings, 1 1, in which are supported and fitted to turn the short shafts 2 3. Shaft 2 has the crank-arm 4 and shaft 3 the crank-arms 5 6, fastened at right angles thereto. To the inner ends of the crank-arms 4 5 are fastened the ends of a horizontal rod, 7, and upon the under sides of the inner ends of said crank-arms 4 5 are formed or secured the holding-feet 8 8 for pressing upon the top of the pile of envelope-blanks B, as hereinafter described. Said feet are preferably padded upon their under sides, in practice, with rubber or similar material; but I do not limit myself to the use thereof. The arm 6 on the outer end of the shaft 3 is connected with a rod, 9, which is in turn connected with an eccentric or crank arm, 10, having a flange, 11, which extends over the periphery of a ratchet-wheel, 12, between the teeth thereof and its pawl 13, as shown in Figs. 1 and 5 of the drawings. Said pawl 13 is hinged to a crank-lever, 14, in turn hinged at 15 to frame A, and operated by a rod, 16, hinged to its lower end. Rod 16 may be connected with a suitable cam on one of the main driving-shafts, as shown, or in any other well-known way to produce the desired motion.

To the frame A at 9' is hinged a pawl, 17, for holding the ratchet-wheel 12 from turning back when said wheel is disengaged from the pawl 13, as shown in Figs. 1 and 5 aforesaid.

The crank-arm or lever 6 on the end of shaft 3 is raised at its inner end to move forward the flanged end 11 of eccentric 10 (for the purpose hereinafter described) by an inclined surface, 18, on the sliding carriage C, passing under a friction-roll, 19, on the side of said arm 6, when said carriage is moved forward toward the front end of the machine. The movement of said flange 11 is reversed by the reverse motion of carriage C, allowing the inner end of arm 6 and parts connected thereto to drop down and assume their normal positions. (Shown in Figs. 1 and 5.) The operation of the arm 6 not only moves the flange 11 forward and back, as aforesaid, but also, through the shafts 2 3, crank-arms 4 5, and rod 7, causes the blank-holding feet 8 8 to be simultaneously lowered and raised so as to press upon or release the top blank of the pile of blanks B on the elevator or table B'. It is obvious that the arms 4 5 may be provided with the feet 8 8 or not, as preferred, the use of the same not being essential, as the ends of said arms may be adjusted in making the machine to serve the same purpose.

The reason for the construction described of the arms 4 5 and rod 7 is not only to obtain a means for holding the top envelope-blank, but also to form an opening between the bearings 1 1, so that the front-flap gummer, 20, may have free play forward and back in gumming said front flaps, as hereinafter described.

The flange 11 on the eccentric or cam arm 10 is for the purpose of preventing the pawl 13 from engaging with and turning the ratchet-wheel 12 until the pile of envelope-blanks have been lowered (by taking one after another from the top) to the point at which said pile is required to be elevated or moved up for the cushioned feet 8 8 and gummer 20 to act upon the same. When the arm 6 is off of the inclined surface 18 for elevating said arm, the downward movement of said arm and parts connected thereto being governed by the ends of the arms 4 5, or their feet 8 8 bearing upon the top of the pile of blanks, it is obvious that as said pile is lowered by the removal of the top blanks said arms or feet, as well as the arm 6 and parts connected thereto, are correspondingly lowered or allowed to drop down, thus gradually moving the flange 11 back toward the center of the machine. By the time a certain number of blanks have been taken from the pile (in this instance sixteen) the flange 11 has been moved back, as aforesaid, a sufficient distance to allow the pawl 13 to drop down upon the ratchet-wheel 12 and engage with one of its teeth. A forward-and-back reciprocating motion being imparted to the lever 13 in the manner hereinbefore described, when it next moves forward the ratchet-wheel is turned one notch or tooth forward in the direction shown by the arrow in Fig. 1, thus correspondingly turning its shaft 21 in the same direction, which operation causes, through the pinions 22 22 and racks 23 23, the blank-elevator B', having the pile of envelope-blanks B upon the same, to be moved up in position for the gummer 20 to operate upon the top blanks thereof, as hereinafter described. Therefore it will be seen that, by the operation of my machine, after each sixteenth blank is removed from the top of the pile, the ratchet-wheel 12 is moved one notch forward and the blank-elevator moved up to again bring the top of the pile of blanks into the required position for the gummer to gum the front flaps thereof. Said upward feed-movement is performed in the interval between the gumming of the front and back flaps of one blank and that of the next succeeding one, the pile of blanks being up in position by the time the front-flap gummer 20 descends upon the same; therefore the operation of the machine is not in the least retarded by the operation of the foregoing mechanism for feeding up the blanks. Said blank-elevator mechanism may be provided with the usual counter-weight, 24², and strap 24, connected with one end of the horizontal shaft 21 and with a hand-wheel, 24', at the opposite end thereof, for raising the elevator independent of the operation of the machine.

The mechanism for gumming the front flaps of the envelope-blanks is constructed and arranged to operate as follows: The pile of envelope-blanks, it will be understood, is placed on the table of the blank-elevator with their front flaps toward the front end of the machine, in the usual way.

Figure 2:
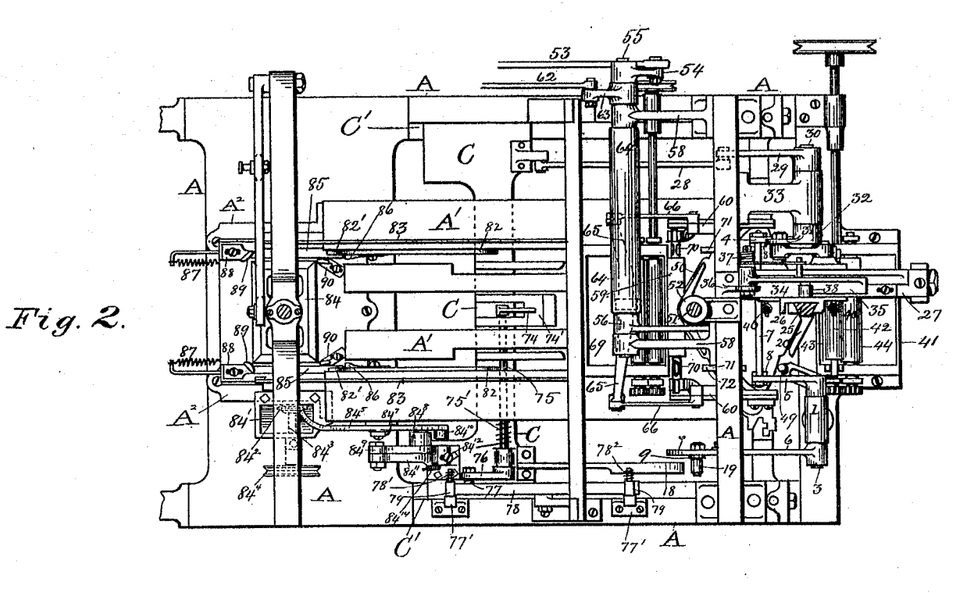
Fig. 2 is a horizontal section through the upper projecting parts of the machine, showing a plan view of so much of said machine as is necessary to illustrate my improvements thereon.

The gummer 20, hereinbefore referred to, is secured to the lower end of a bar, 25, which is fitted to slide up and down in a vertical guide opening or way formed in the frame 26, and said frame 26 is in turn fitted to slide back and forth horizontally on the projecting frame 27, formed upon or secured to main frame A. It is moved forward and back by means of the longitudinally-sliding carriage C through the connecting-rod 28, arm 29, shaft 30, arm 31, and link 32, the latter being hinged to the sliding frame 26 and connecting-rod 28 to carriage C. The shaft 30 is fitted to turn in a stationary bearing, 33, on frame A. The vertical bar 25 is raised to elevate the gummer 20 in the following manner: A leaf or bridge, 34, is provided with the beveled or wedge-shaped flange 35, is hinged to a stationary bearing, 36, on the frame 27, and is held down so that its beveled end will bear upon the top of said frame 27 (except when forced up therefrom, as hereinafter described) by means of a spring, 37, being provided with a hub or projection for the outer end of said spring to bear upon, as shown in Fig. 2. When the sliding frame 26 is moved back by the carriage C toward the center of the machine, a roll, 38, on the vertical bar 25, coming against the inclined flange 35 aforesaid, travels up over the same and thus raises said vertical bar 25, and, in consequence, the gummer 20 upon the lower end thereof. As soon as the roll 38 arrives at the upper end of said inclined flange 35, it drops down upon the top of the pile of blanks upon the motion of carriage C being reversed. The roll, being moved with it, passes forward under the leaf or bridge 34, and, forcing up the inclined flange 35 thereof, passes in front of the same, and, having arrived at its extreme forward throw, is then reversed or moved back to again raise the gummer 20, as before described, and so on continuously at each reciprocating movement of carriage C back and forth in the operation of the machine.

The elevated end of the leaf or bridge 34 is arranged at the proper point on the stationary frame 27 to cause the gummer to be dropped directly over the edge of the front flaps of the pile of envelope-blanks. Said dropping operation may be facilitated in practice by providing the upper end of the vertical bar 25 with a suitable weight, 39. Springs 40 40 may also be used for the same purpose, if desired, as shown in Fig. 1.

The gummer 20 is gummed upon the bottom thereof prior to each operation of dropping the same upon the edge of the envelope-blanks, as aforesaid, in the following manner: Just in front of and a little below the top blank (when in position to be gummed) is arranged the usual gumming-box, 41, provided with the gum-rolls 42 43 44. Said gum-rolls are arranged and operated in the usual way, as shown in the drawings, and the gum is applied from the roll 42 to the bottom of the gummer 20 by the latter being passed over the surface thereof when moved forward by the carriage C toward the front of the machine and back again preparatory to gumming the next blank. Therefore, as will be seen, each forward movement causes the gummer 20 to pass over the surface of the roll 42 to be gummed upon the bottom thereof, and its reverse or back movement causes the same to be elevated and dropped upon the edge of the top blank to gum the front flap thereof.

Figure 4:
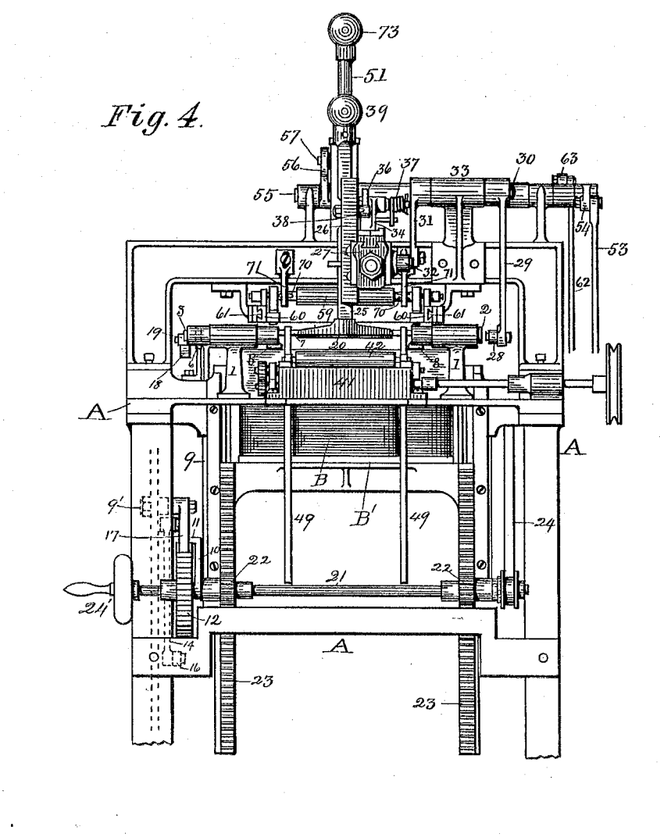
Fig. 4 is a front end view of the machine.

The blanks are held in position horizontally upon the elevator B' of the machine by means of the usual (adjustable) vertical rods, 49. (Shown in Fig. 4.) The two back ones are not shown.

The mechanism for gumming the back flaps of the blanks and for raising or picking up said blanks from the pile into position to be gripped by the finger of the feed mechanism, hereinafter described, for conveying the blanks to the folding mechanism, is constructed and arranged to operate as follows: The part marked 50 represents the picker of said back-flap gumming and picking-up mechanism, said picker serving to both gum and pick up the envelope-blanks, as hereinafter described. It is secured to the bottom of a vertical rod or bar, 51, fitted to slide up and down in a stationary bearing, 52, on frame A, and may be operated by means of a cam, 52', on the main driving-shaft 104, through the cam-roll 53', connecting-rod 53, crank-lever 54, horizontal shaft 55, and crank-lever 56, the latter being connected with a stud, 57, secured to the vertical rod 51. Said cam is in practice made of the proper form to impart the desired motion to the gummer and picker-head 50. Shaft 55 is fitted to turn in suitable bearings, 58 58, on frame A, and crank-levers 54 and 56 are secured to said shaft 55. The picker 50 has vertical movements only imparted to it, and is arranged directly over the edges of the back flaps of the envelope-blanks. Therefore, when it is lowered or dropped down upon the pile, the back flap of the top blank is gummed, and when the picker ascends it lifts said top blank with it to the point where the feed mechanism grips it, as hereinafter described. It is lowered to thus gum the top blank by the mechanism hereinbefore described, just after the front flap has been gummed by the gummer 20.

During the aforesaid gumming operations the top blank is held in position by the holding-levers 4 5, which are raised to release said blank just in advance of the aforesaid lifting operation.

The cam for operating the picker 50 is so formed as to cause said picker to descend upon and gum the top blank, as above described, and to impart a double upward movement to the same in ascending, for the following purpose: In order that the finger of the feed mechanism for conveying the blanks to the folders may have time to grip and remove the blank from the bottom of the picker, the latter is first moved up to a level with said finger and there stopped for an instant, or for a sufficient time for said finger to close down upon the same and grip it, as hereinafter described. Its upward movement is then continued, which causes the blank to be removed therefrom and left in the grasp of the aforesaid finger. Upon the picker reaching its extreme upward movement the gum-roll 59 is made to pass under and in contact with the same to gum its bottom surface, as hereinafter described, preparatory to gumming the next envelope-blank.

The gum-roll 59 is moved forward and back in substantially a horizontal line to deposit the gum upon the bottom of the picker 50 when the latter is elevated, as hereinbefore described, in the following manner: The ends of said gum-roll are fitted to turn in bearings in the carriages 60 60, which are fitted to slide forward and back in ways 61 61 on the frame A. Said carriages 60 60 may be moved forward and back, as aforesaid, by means of a connecting-rod, 62, crank-lever 63, sleeve 64 on shaft 55, double-crank lever 65, and connecting link-sections 66 66, the latter being connected with said carriages 60 60. Connecting-rod 62 is operated by a cam, 62', on shaft 104', through the cam-roll 63' on said connecting-rod 62. Said cam 62 is in practice so formed and timed in connection with the picker mechanism as to move the roll 59 forward just in time to pass under and in contact with the bottom of the picker when the latter is elevated, as hereinbefore described.

The gum-roll 59 receives its gum from a gum-box, 69, arranged just back of the picker 50 and pile of envelope-blanks B, and a sufficient distance above the level of the top of said pile of blanks, when the latter is elevated to allow the gripping device, hereinafter described, to pass in between said parts to grip and draw back the blank after having been gummed, as hereinbefore described. The gum-box 69 is provided, as in the former instance, with the usual rollers, 67 and 68, arranged to operate in connection with the roll 59, as ordinarily. In order that said gum-roll 59 may be turned a partial revolution between each operation of applying the surface thereof against the bottom of the picker 50, so as to bring different portions of the same against said picker to properly gum the bottom thereof, I make the hubs 70 70 of said roll, between the roll and its bearings, of polygon or irregular shape in cross-section, and upon each side of frame A, I secure a curved finger, 71, having the inclined or beveled end 72, said fingers being arranged at the proper points for the hubs 70, aforesaid, to come in contact with, and travel over when the roll is moved forward and then back again, as hereinbefore described, thus causing said roll to be turned, as shown, by full and dotted lines in Fig. 11, with the result above stated.

The downward movement of the picker-rod 51 may be facilitated in a similar way to the gummer-bar 25 by means of the weight 73. A spring or springs may also be employed for the same purpose, as in the former instance, if desired.

The finger 74 of the feed mechanism, for conveying the blanks back from the picker toward the folders, is lowered and raised to grip the blank between the forward end of the same and the end 74' of carriage C, and to release said blank, by the forward and backward movement of said carriage, through the horizontal shaft 75, crank-lever 76, roll 77, tilting or rock lever 78, and locking-levers 79 79 at each end thereof.

Figures 8, 9, 10, 11, 12:
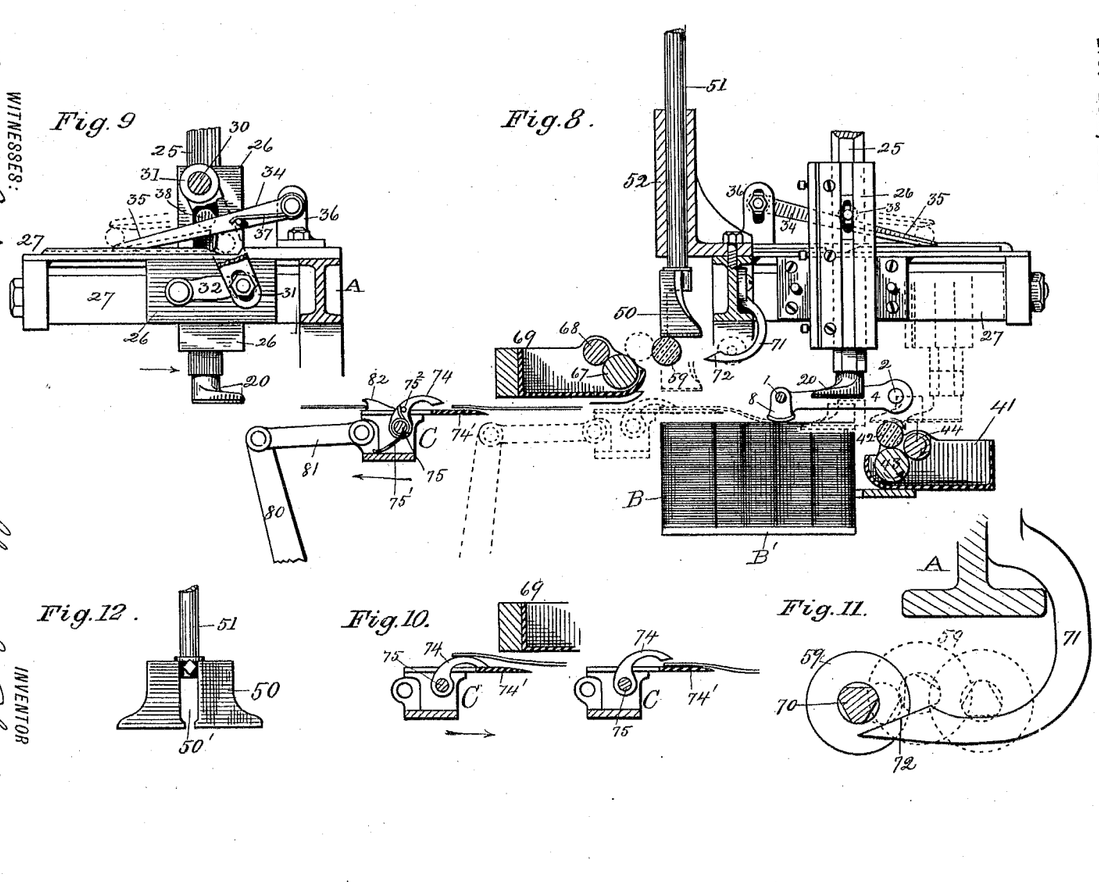
Fig. 8 is a central vertical section through the front end of the machine, showing parts of my improvements, also hereinafter described.
Fig. 9 is a side view of the gummer or sealer of my machine, showing the mechanism for imparting to the same both a vertical and horizontal reciprocating motion.
Fig. 10 represents views in different positions of the gripping-finger and envelope-blank, also showing a part of the gum-box, in which is held the gum for supplying the "picker" of the machine.
Fig. 11 represents the picker gum-roller in different positions in relation to the inclined finger for giving to said roller a rotary motion, as hereinafter described.
Fig. 12 is a front view of the picker-head and a part of its supporting-rod.

The finger 74, shaft 75, crank-lever 76, and roll 77 are arranged to move with the carriage C, while the parts 78 and 79 79 are arranged on the bed A. The construction and operation of said parts, in connection with the forward and back reciprocating movements of carriage C, are as follows: A constant pressure is imparted to the finger 74 to keep it in contact with the end 74', except when forced up, as hereinafter described, by means of a spiral spring, 75', having one end fastened in the shaft 75, or bearing downward on a pin, $75^2$, in the finger 74, as shown in Fig. 8, and its free end bearing upon the top of carriage C, or any equivalent device for producing a like result. The lock-levers 79 79 have a pressure imparted to their outer sides, to keep them in contact with the ends of the rock-lever 78, by means of springs 78' 78², or equivalent means. Said levers are hinged at their upper ends on studs or pins fastened in supporting standards 77' 77', extending up from frame A. The under side of the rock-lever 78 acts as a cam when locked at either end for the roll to travel against and receive its motion from; therefore said curve is made to conform to the motion desired to be imparted to the gripping-finger 74. Each lock-lever is provided with a holding-notch upon its inner side for the ends of the rock-lever 78 to catch and hold against alternately at first one end and then the other, as said lever is alternately rocked in first one and then the opposite direction by means of roll 77 and its actuating mechanism, as hereinafter described.

Figure 3:
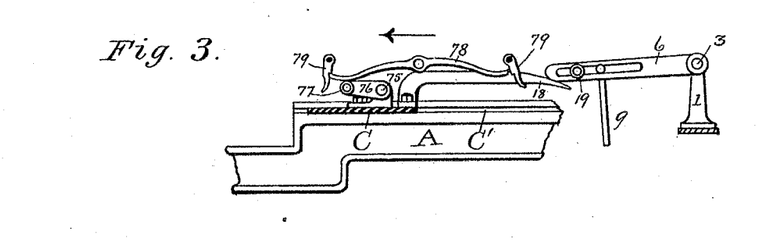
Fig. 3 represents a front side view of the mechanism for raising and lowering the gripping-finger of the feed mechanism of the machine; also, other parts hereinafter more fully explained.

Referring to Fig. 3, assuming that the left-hand end of the rock-lever 78 is locked and the roll 77 is traveling from right to left, as shown by the arrow, when said roll comes against the downwardly-curved part at the end of said lever it is forced down, and consequently causes the finger 74 to be raised, as shown in Fig. 8. Said roll, continuing to move forward, pushes the lock-lever at this end back away from the end of the rock-lever, and thereby allows the roll to be sprung up, carrying said end of the rock-lever with it. Said operation causing its opposite end to be depressed below the holding-notch of the lock-lever at said opposite end allows the latter to be sprung forward to lock the rock-lever in its new position, and thereby bringing the opposite curve or cam surface thereof in the line of travel of the roll 77, when the motion of the latter is reversed by the reverse motion of carriage C. As the roll 77 travels toward the right after its motion has been reversed, as aforesaid, when it comes in contact with the cam surface of the rock-lever at the right-hand end thereof, the finger 74 is again raised and then lowered by the unlocking of the lever, as hereinbefore described.

The above-described mechanism is so timed in relation to that for picking up the blanks that by the time the top blank has been elevated in position to be gripped, as hereinbefore described, the roll 77 has arrived in position to raise the finger 74, which, moving forward with the carriage, passes over the top edge of said blank. Upon the roll arriving at the end of its forward movement the rock-lever is unlocked, thereby allowing the finger to be sprung down upon the edge of the blank. Said operation causes it to be removed or knocked off of the bottom of the picker onto the front end, 74', of carriage C, where it is held by the pressure of the finger upon the top edge thereof. The carriage now being reversed causes the blank to be drawn or conveyed back toward the folding mechanism until released by raising the finger again off of the same. The latter operation is performed by the roll 77 coming against the cam-surface at the rear or left-hand end of the rock-lever 78, as hereinbefore described. After thus depositing the aforesaid blank the carriage C now moves forward again with the finger in its normal or depressed position, said finger passing under the blank it has just released and under the picker gum-box and its rolls, and, continuing on, opens and grips and draws back the next and each succeeding blank in the manner previously described.

In practice I find that one set of jaws, 74 74', is sufficient to properly grip and feed back envelope-blanks of ordinary size; but for large envelopes it is preferable to use two or more sets, and I therefore reserve the right to employ more than one set, the parts for supporting and operating the same being made to correspond therewith, according to circumstances.

From the foregoing description of the back feed or blank conveying mechanism it will be seen that the finger 74 acts as the upper jaw and the end 74' of carriage C as the lower jaw of the blank gripping and conveying device. Said device in gripping the blank is moved forward only a sufficient distance for the forward end of the finger 74 to grip the back edge of the blank between the same and the under jaw, 74'.

The mechanism hereinbefore described for raising and lowering the finger 74 is fully described and claimed in an application for a United States patent for improvements in mechanical movements numbered 199,198, filed by me April 17, 1886, and I therefore make no claim thereto except in combination with the mechanisms hereinbefore described for gumming and picking up the envelope-blanks as they are fed up into position to be thus operated upon.

In the operation of my machine, while one blank is being drawn back by the gripping device, as before described, the one previously drawn back and deposited is being moved back by means of the hooks or projections 82 on carriage C, (see Figs. 2, 6, and 8,) and the one in advance of the latter is also moved forward by another set of hooks, 82', on the carriage, into position to be pushed down into the folder-box by the plunger 84, in the usual way. Said back-feeding mechanism, aside from the portion thereof for drawing back the first blank from the picker, is substantially like other machines, and therefore requires no detailed description. The folding mechanism is likewise of ordinary construction, as is also that for counting the envelopes as they are deposited in the counter-box, as hereinafter described.

As the blanks are fed back over the table A' of the machine in the manner hereinbefore described, they are kept in their proper positions by means of guides 83 83, which are elevated just enough above the top of said table to allow the blanks to pass between the same and the top of said table. Backward movement of the blanks is prevented after having been moved back and deposited by the conveyer when the latter returns toward the picker 50 by means of fingers 83′, hinged to the sides of said guides 83 in the usual way, as shown in Fig. 6.

In order that the gripping-finger 74 may move forward in front of the picker 50 a sufficient distance to pass over and grip the edge of the envelope-blank, as hereinbefore described, I form a slot, 50′, at the center of said picker, through which said finger may pass, as shown in Fig. 12 of the drawings.

Figure 6:
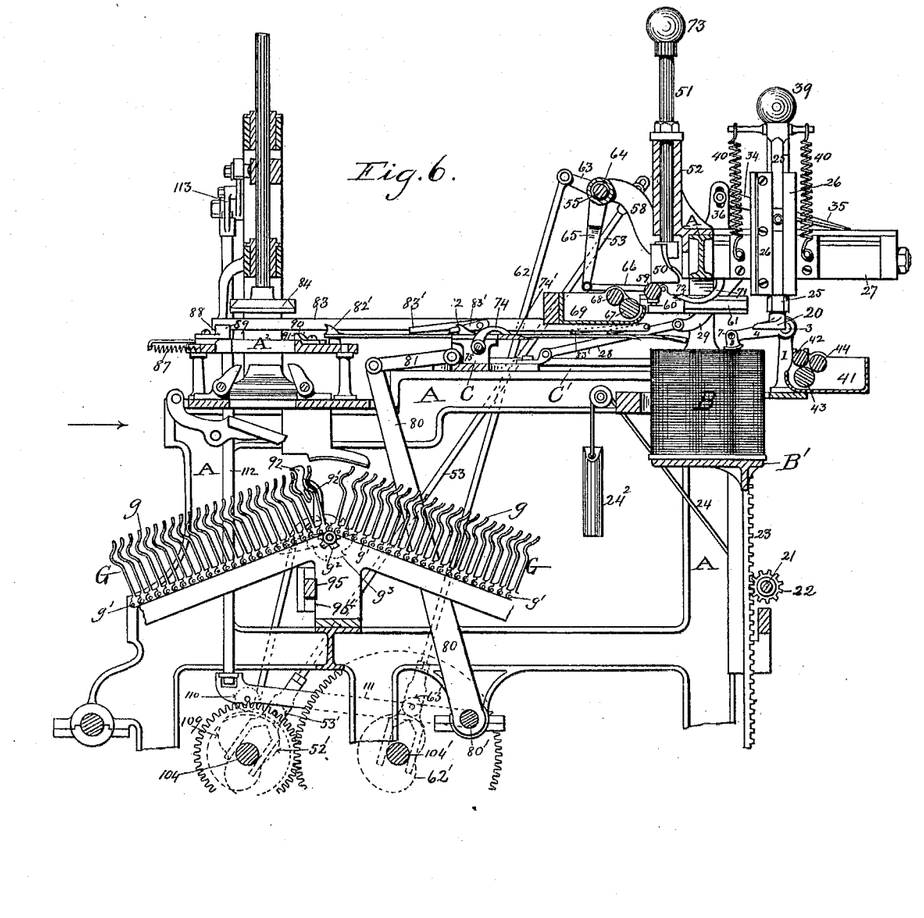
Fig. 6 is a longitudinal vertical section through the parts shown in Figs. 1, 2, and 4.

A forward-and-back reciprocating motion may be imparted to carriage C, to produce the results hereinbefore described, by an eccentric, $104^2$, on the main shaft 104, through the connecting-rod 105′, crank-lever $80^2$, shaft 80′, crank-lever 80, and link 81, the latter being hinged to said carriage, as shown in Figs. 1, 6, and 8.

Said eccentric $104^2$ is so formed in practice as to move the carriage forward and back with a reciprocating motion, to feed each successive envelope-blank back toward the folding mechanism, as hereinbefore described.

The carriage C is fitted to slide back and forth, as aforesaid, in suitable ways, C′ C′, in frame A. The plunger 84 may be operated in the usual way by means of a cam, 109, on the main shaft, through the cam-roll 110, hinged lever 111, connecting-rod 112, and hinged lever 113, said plunger mechanism being in practice timed to cause the plunger to descend at the proper time to push the blank under the same down into the folding-box of the machine, to be folded in the usual way, as before stated.

Figure 13:
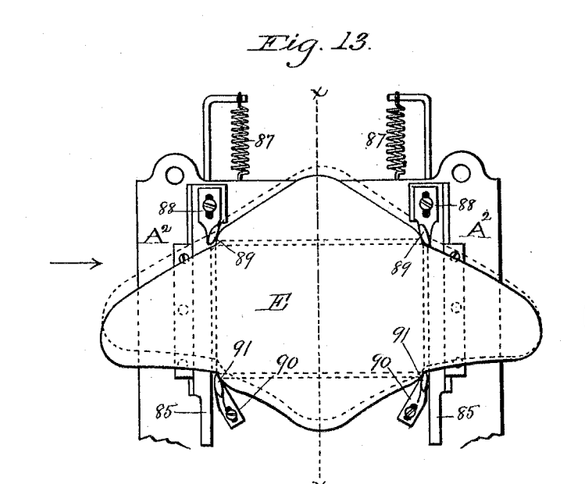
Figs. 13 and 14 represent plan views of the parts for holding the envelope-blanks in position prior to the "plunger" of the machine descending to force said blanks into the "folder-box.
Figure 14:
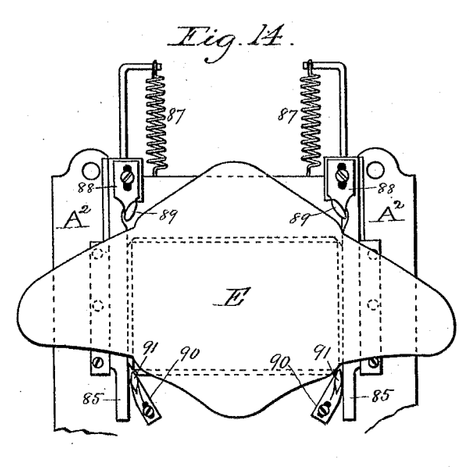

My improvements in the means for holding the blank in position over the folder-box preparatory to the plunger descending upon the same, as above described, consist of two movable stop-guides, 88 88, which are operated and act against the back edge of each envelope-blank fed forward by the carriage, as hereinafter described, and the stationary stops or guides 90 90, against which the front edges of said blanks bear when in position over the folder-box, as shown in Figs. 13 and 14 of the drawings. The purpose and operation of said movable and stationary guide-stops are as follows: When the blank is pushed forward by the hooks 82′ 82′, it is naturally carried with considerable force by the quick backward movement of the carriage. Therefore when said carriage reaches its extreme backward movement the tendency is for the blank to continue on beyond said stops a short distance beyond its proper stopping-point over the folder-box, owing to the momentum imparted to said blank by the aforesaid quick backward feed-movement. Therefore, in order to prevent injury to the back edge of the blank, I move the back-stops 88 88 out of the way of said blank just prior to the latter being pushed over the folder-box, thus forming no impediment to the blank, which moves forward when delivered by the carriage into about the position shown by dotted lines, Fig. 13, and full lines, Fig. 14, and consequently causing no injury thereto, which would be likely to occur if the usual rigid back-stops were used. Immediately upon the motion of the carriage C being reversed the back-stops 88 88 are moved forward into their normal positions again, which operation causes the blank to be pushed up into position between the same and the stationary stops 90 90, as shown by full lines in Fig. 13.

Figure 15:
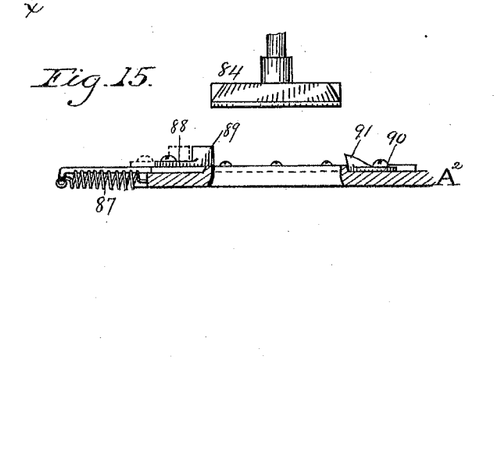
" Fig. 15 represents a vertical section through the parts shown in Figs. 13 and 14, taken on line *x x*, Fig. 13, looking in the direction indicated by the arrow, same figure, in said Fig. 15 the envelope-blank not being shown, as in the former instances.

Various ways may be employed for operating the stops 88 88, as hereinbefore described, and I therefore do not limit myself to any special method. In this instance they are so operated in connection with the forward movement of the carriage in the following manner: At each side of the folder-box are arranged two longitudinal bars, 85 85, fitted to slide in suitable ways in the top plate or creasing-die, $A^2$, of the folder-box, and adapted to be pushed back by each backward movement of carriage C by means of the stops 86 86 on said carriage coming against the ends of said sliding bars. The bars are drawn forward into their normal positions to push the blank up into position when the carriage C is reversed from its backward to a forward movement by means of the springs 87 87, fastened at their inner ends to the creasing-die $A^2$ and at their outer ends to the outer ends of arms extending back from the bars 85 85, as shown in Figs. 13, 14, and 15.

The stop-guides 88 88, hereinbefore referred to, are arranged on the rear end of said bars 85 85 and are made adjustable, as are also the stops 90 90, being provided with vertical slots and set-screws for that purpose. Both the movable and stationary stops are also provided with upwardly-projecting flanges 89 89 and 91 91, respectively, for the edges of the blanks to bear against. It will therefore be seen from the above description that when the carriage C is moved back toward the plunger the stops 88 88 are also moved back in advance of the same out of the way of the blank being pushed back, and when the motion of the carriage is reversed the stops follow, with the result hereinbefore described.

As the blank is pushed back by the carriage, it passes up over the inclined sides of the stationary stops 90 90 and drops down over the folder-box in front of said stops, and is thereby held against being moved too far forward when the movable back-stops 88 88 come up against the back edge thereof, as previously stated. Therefore, the carriage not being further needed in the manipulation of said blank, it at once returns without delay after depositing it as aforesaid, the guide-stops taking care of the same independent of said carriage, as hereinbefore described.

My improved device for gumming one of the side flaps of the blanks consists of a roll adapted to turn slowly in a box containing gum or a similar adhesive substance and a head adapted to press the end of the side flap to be gummed onto the periphery of said slowly-rotating gum-roll when said side flap is fed over the same, and thus deposit the requisite amount of gum thereon to secure the side flaps, when the envelope-blank is folded in the usual way.

The employment of a slowly-rotating roll and a head having a reciprocating or oscillating motion constitutes the essential features of my gumming device, and is for the purpose of doing away with the usual gumming-blade having an up-and-down reciprocating motion.

Figures 23, 24:
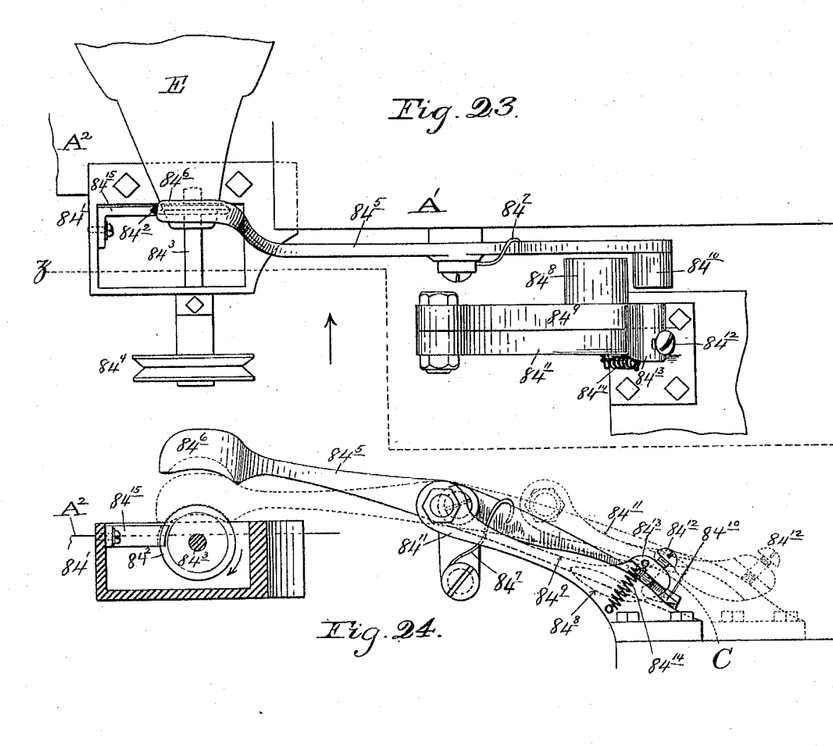
Fig. 23 is a plan view of my improved device for gumming one of the side flaps of the envelope-blanks, so much of other parts of the machine also being shown as is necessary to illustrate the application and operation of said gumming device.
Fig. 24 represents a vertical section taken on line *z z*, looking in the direction of the arrow in said Fig. 23, and also showing portions of the device in side view.

Various ways may be employed for operating the gum-roll and the compressing-head of my device, and I therefore do not limit myself to any special mechanism. In this instance I have shown said operations as being performed as follows: A gum-box, 84', is secured to the creasing-die $A^2$, between the folder-box and the front side of the machine, which is provided with a gum-roll, $84^2$, whose supporting-shaft $84^3$ is fitted to turn in suitable bearings at each side of said box, and operated by a pulley, $84^4$, secured to its outer end. Said pulley may in turn be operated by means of a belt connected with suitable driving mechanism, whereby the gum-roll may have a slow rotary movement imparted to it, as before stated. Said belt and mechanism being of ordinary well-known construction, it is deemed unnecessary to describe the same. When the blank is fed over the folder-box, the side flap thereof to be gummed projects about one-eighth of an inch over the top of the aforesaid gum-roll, and the under side of said flap is gummed by pressing the end of said side flap down for an instant upon the slowly-rotating gum-roll, thus depositing thereon the requisite amount of gum. Said operation is performed just in advance of the plunger 84 descending upon the blank by means of a lever, $84^5$, (see Figs. 1, 2, 23, and 24,) hinged to a stationary bearing, and whose head $84^6$ is forced down upon the top of said side flap, over the roll, to produce the above-described result. The lever $84^5$ is in its normal position when its head is elevated above the gum-roll $84^2$, being thus held (except when forced down) by means of a suitable spring, $84^7$, as shown in Figs. 23 and 24. The lever is tilted so as to bring its head down upon the envelope-blank, as aforesaid, by the forward movement of carriage C toward the front end of the machine, said operation causing a curved hub, $84^8$, on a hinged lever, $84^9$, to come against a curved hub, $84^{10}$, on the end of lever $84^5$ and force the same up, thus depressing the opposite end of the lever with its head down upon the blank with the result hereinbefore stated. The lever $84^9$ is hinged to the outer end of an arm, $84^{11}$, projecting up and back from the rear end of carriage C. Its free end may be gaged so as to adjust the downward movement of the head $84^6$ more or less, as required, by means of a set-screw, $84^{12}$, fitted to turn in and out of a flange, $84^{13}$, on said lever $84^9$, and adapted to bear at its lower end against the top of the arm $84^{11}$ near its base end, as is fully shown in Figs. 23 and 24.

By the aforesaid construction it is obvious that when the carriage C moves back toward the folder-box the hub $84^8$ on the lever $84^9$ passes over the hub $84^{10}$, said lever $84^9$ being raised a short distance in so doing and then dropping back again into its normal position shown in Fig. 24 after passing by said hub $84^{10}$; whereas, when said carriage is reversed or moved toward the front end of the machine, the hub $84^8$ coming in contact with the hub $84^{10}$, raises the latter with the result hereinbefore described, owing to the edge of the hub $84^8$ next to the hub $84^{10}$ being a trifle below the level of the latter and inclined upward away from said hub $84^{10}$, as shown in Fig. 24. In said figure the arm $84^{11}$ and parts connected therewith, also lever $84^5$, are shown by dotted lines in the various positions which they occupy when the head $84^6$ is in a depressed position, or the position occupied by the same in pressing the end of the side flap of the blank upon the periphery of roll $84^7$, as previously explained. The arm $84^9$ may be held, if desired, in its depressed or normal position with the end of the screw $84^{12}$ upon the arm $84^{11}$, except when forced up, as before specified, by means of the spring $84^{14}$. (Best shown in Fig. 24.)

The part $84^{15}$ on the gum-box 84' serves as a scraper to remove superfluous gum from the roll $84^2$, and to thus regulate the amount of gum deposited upon the blank by moving the scraper toward or from said roll, said scraper being in practice made adjustable for the above purpose.

The chain G, for holding the envelopes while being dried, is constructed and arranged to operate in the usual way, being provided with a series of fingers, $g'$, hinged together by means of pins or bolts $g'$, the latter serving the double purpose of fastening said fingers together to form an endless chain, and as teeth which engage with a pinion, $g^2$, by means of which said chain is driven. Said pinion is alternately driven and stopped to impart to the chain an intermittent forward feed motion by means of a cam on the main shaft, through a lever and pawl, the latter being in practice arranged to work in connection with a ratchet-wheel, $g^3$, on the outer end of the pinion-shaft or spindle $g^4$. Said parts for operating the chain G, being of ordinary well-known construction and operation, need not be fully illustrated or further described.

Figure 7:
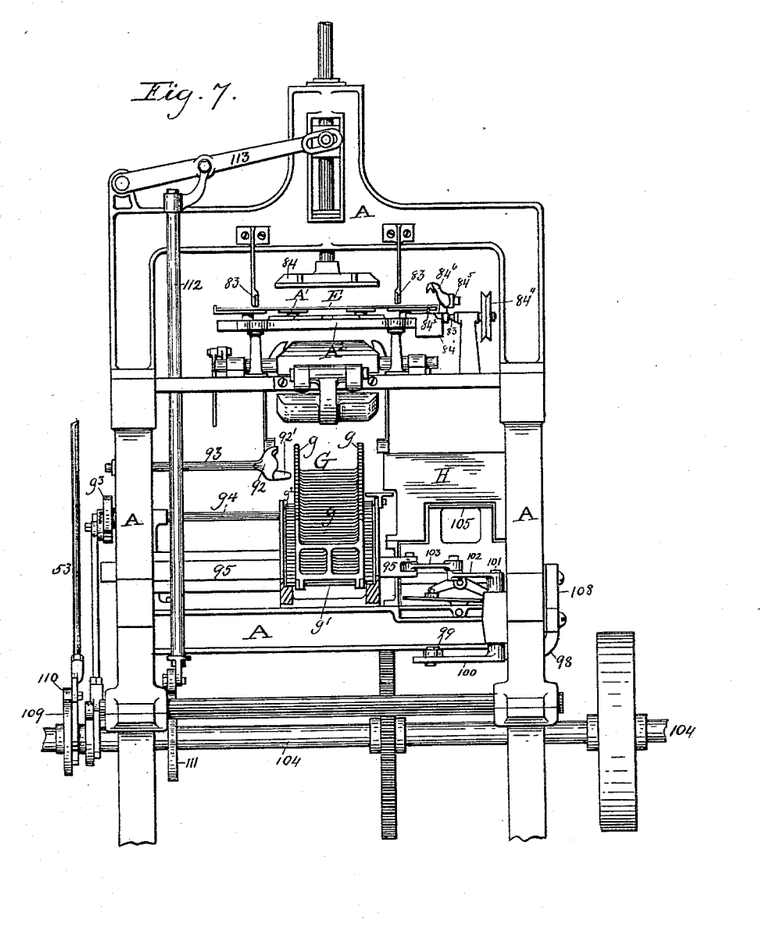
Fig. 7 is a back or rear end view thereof looking in the direction of the arrow at the left of Fig. 6.
Figure 16:
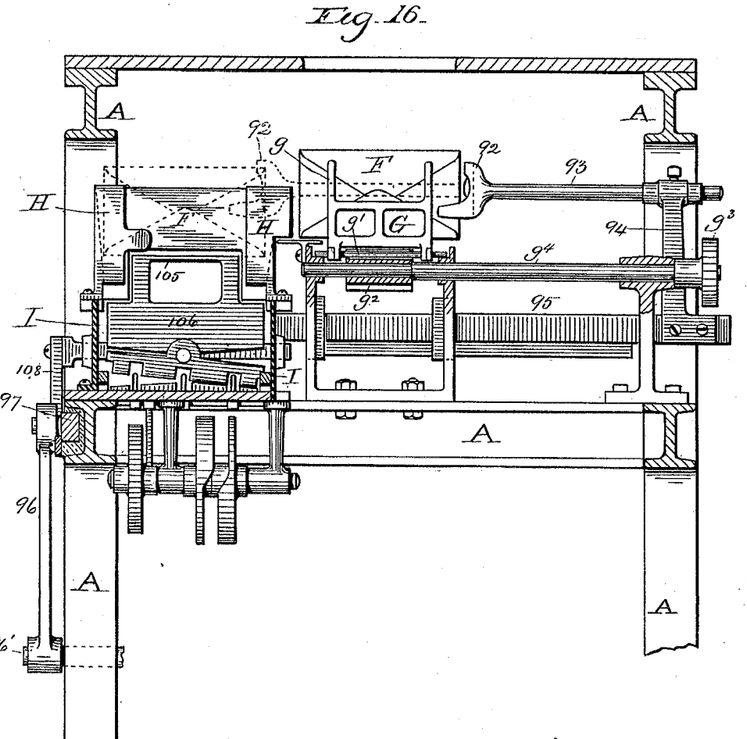
Fig. 16 represents a transverse vertical section through the machine, showing a front side of parts of my improved mechanism for removing the finished envelopes from the drying-chain of said machine.
Figure 17:
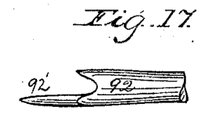
Figs. 17, 18, and 19 represent different views of the forked head for pushing the finished envelopes from the drying-chain of the machine.
Figure 18:
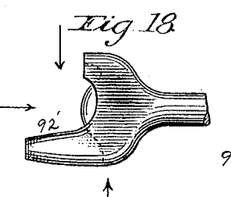
Figure 19:
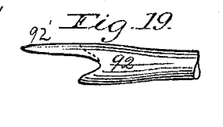
Figure 21:
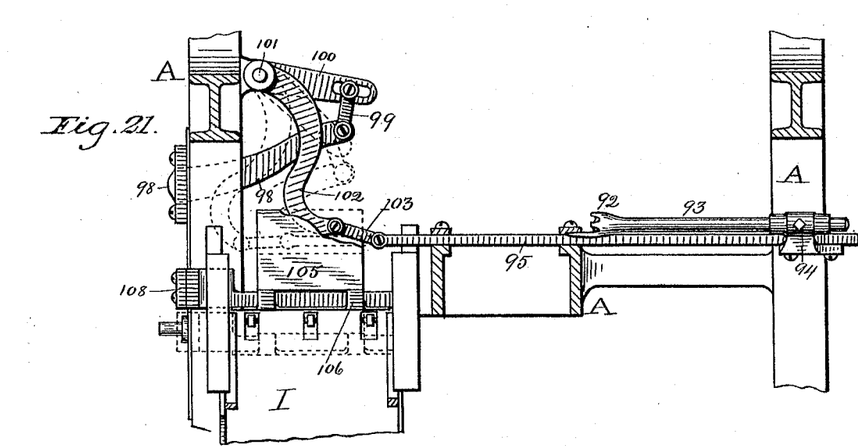
Fig. 21 is a plan view of the mechanism for operating the forked pusher-head aforesaid, and also of the movable envelope-supporting plate of the receiver and a part of the counter-box of the machine.
Figure 22:
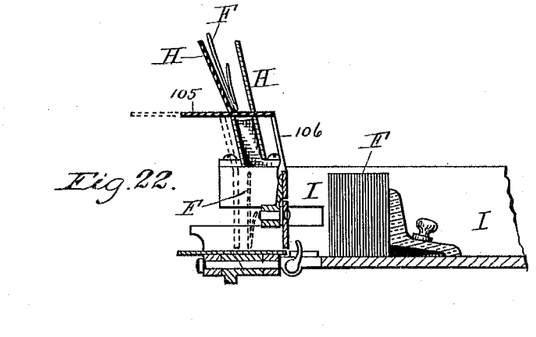
Fig. 22 is a vertical section through the envelope-receiver, the movable supporting-plate thereof, and a part of the counter-box.

As the aforesaid drying-chain is slowly rotated with an intermittent motion, the envelopes as fast as folded are dropped down one after another into each succeeding space between the fingers $g$ thereof, and when the chain is full the first envelope dropped down, and each succeeding one as fast as dried, is pushed from between the fingers of the chain into a receiver, H, (preparatory to being dropped into the counting-box I of the machine, as hereinafter described,) by means of a forked head, 92, arranged to be operated forward and back horizontally through each space between the fingers as it comes in line therewith, in the following manner: Said forked head 92 is formed upon or secured to the inner end of a horizontal rod, 93, which is in turn secured to an upright arm, 94, fastened to a horizontal bar, 95. Said bar 95 is operated forward and back by a crank-lever, 96, through the slide 97, arm 98, link 99, arm 100, vertical shaft 101, curved arm 102, and link 103, the latter being connected with the inner end of said bar 95. The slide 97 is fitted to move in a guideway in frame A, as shown in Figs. 1 and 16. Lever 96 is arranged to turn upon a short shaft or journal, 96', and has the usual desired rocking motion imparted to it by a cam, 114, on the main shaft 104, and a spring, 115, secured to frame A and to the upper end of said lever. (See Fig. 1.) The arm 98 is secured at its outer end to the slide 97. The bar 95 is in practice fitted to slide forward and back in a suitable stationary way, 95', and arms 100 and 102 are secured to opposite ends of a vertical shaft, 101, as shown in Figs. 1, 7, and 21.

As the envelopes are pushed out of the drying-chain G they are deposited upon a movable supporting-plate, 105, forming the bottom of the receiver H, hereinbefore referred to. Said supporting-plate is provided with an inclined side or surface, 106, inclined toward the counter-box I, where the envelopes are deposited one after another from the receiver, and counted into bunches in the usual way.

The supporting-plate aforesaid is moved forward and back with the slide 97, being connected therewith by means of the strap 108, the upper end of said strap being fastened to the carriage supporting said plate and its lower end to the slide 97.

Figure 20:
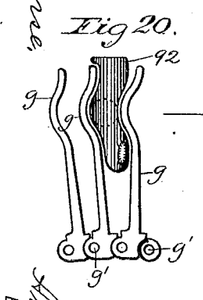
Fig. 20 represents the position that the forked pusher-head above referred to occupies between the fingers of the drying-chain when moved forward to push out or remove the finished envelope therefrom.

By the foregoing construction of the parts for operating the bar 95 it will be seen that when the lever 96 moves toward the right, as shown by the arrow, Fig. 1, the forked head 92 is moved toward the receiver H, and in the opposite direction when the motion of said lever is reversed toward the left. Each envelope is pushed forward out of the carrying-chain just prior to the envelope last folded being dropped down into the same, and the fingers are separated at the point where the envelope is dropped down, as aforesaid, so as to allow said envelope to thus drop in between said fingers by the sharp bend made in the chain in passing over its driving-pinion $g^2$, hereinbefore referred to. The forked head 92 is in this instance arranged to come in line with the space next back of that where the last-folded envelope is dropped into the chain, and is made to conform with the curvature of said fingers, as shown in Figs. 6 and 20, so that it may be passed forward and back freely between said fingers. Said operation is facilitated by means of a finger or prong, 92', formed upon or secured to the front end of said head and adapted to enter between the fingers in advance of said head, thereby insuring the opening of the space between the same by pushing forward slightly the front finger, and thus releasing the envelope from any pressure of the fingers and insuring the free delivery thereof from the chain.

In the operation of the machine the chain G is stopped just long enough after each folding operation for the forked head to push out the first dried envelope and for said folded envelope to drop into said chain. In practice the machine is arranged and timed to push out the dried envelope just in advance of dropping in the newly-folded one; but, if desired, both operations may be performed simultaneously or reversed from that above described. In any case the chain is stopped only for a moment after each envelope is dropped into the same before moving on to the point at which the next envelope is delivered thereto, and so on continuously for each succeeding envelope to be dropped in and pushed out, as aforesaid.

When the envelopes are delivered into the receiver H, as hereinbefore described, the supporting-plate 105 is in its forward position; but as soon as the envelope is deposited thereon it is moved back in the manner hereinbefore described, so that said envelope may slide down over the inclined surface 106 into the counter-box I. Immediately upon the envelope being allowed to slip down into the counter-box the motion of the supporting-plate is reversed or moved forward again to receive the next succeeding envelope fed forward by the forked head 92, and so continues to operate for each following envelope.

Although I prefer in practice the construction and arrangement of mechanism hereinbefore described for operating the head 92 and blank-supporting plate 105, I do not limit myself thereto, as the same result may be effected in various ways without departing from the principle of my invention.

The mechanism for counting the envelopes into the required bunches as they are delivered into the counter-box being made in accordance with previous United States patents granted to me, I have not shown the same, and it will be unnecessary to further describe it to make clear the nature of my improvements.

The operation of the machine may be briefly summed up as follows: Assuming that the pile of envelope-blanks is in its proper elevated position, ready for the top blank to be gummed, and the gummer 20 is in position to be lowered or dropped down upon said pile of blanks, by now starting up the machine said gummer is dropped upon the front edge of the blank, thereby gumming the front flap thereof, when it is then moved forward off of said blank, the latter being held so as to not be drawn forward with said gummer by means of the holding-levers 4 5, having the cushioned feet 8 8, as hereinbefore described. Immediately upon the gummer 20 being moved forward off of the blank, as aforesaid, the picker descends and gums the back flap of said blank, and when it ascends raises the same to the proper point for the finger of the back-feeding device to come down upon and grip it, the picker then continuing to ascend to be regummed, as hereinbefore described. As soon as the blank is thus gripped, the carriage C moves back, drawing said blank with it to a certain point, where it is left for the time being, as also hereinbefore described, said carriage then being reversed or moved toward the front end of the machine to grip the next blank, then back again with said newly-gummed blank, and so on continuously for each succeeding blank gummed and picked up by the gummer 20 and picker 50, as hereinbefore described. Each backward movement of the carriage C causes the blank last drawn back by the finger to be pushed back under the plunger 84 by means of the hooks on said carriage previously referred to. As soon as the blank is deposited under the plunger 84, as aforesaid, one of its side flaps is gummed by the gumming device hereinbefore described. Having been thus gummed, the plunger then descends and forces the blank down through the top opening of the folder-box under said plunger. The folding-flaps of the folding mechanism now being operated fold over the flaps of the blank, and their gummed surfaces are brought in contact with the parts to which they are fastened, as usual, thus completing the envelopes ready to be dried. As fast as folded they are dropped one after another into the drying-chain G and carried around the length of said chain, which is made long enough in practice to insure the drying of the envelopes before being removed from the same at the end of said circuit. The chain has an intermittent motion imparted to it, as before stated, being alternately stopped and carried forward for each envelope fed into and from the same, and to bring each succeeding pair of spaces between the fingers in line to perform said operations, as hereinbefore described. As the chain is thus moved forward after said chain has been filled with envelopes, the first one dropped in and dried, and each succeeding one thereafter, is pushed out one after another by the forked head 92 as they are moved forward and stopped in line therewith into a receiver, H, and from there are dropped into the counter-box I to be automatically counted off into bunches of the desired number. The attendant then removes them from said counter-box as fast as bunched up, and bands and boxes the same.

I am aware of the United States reissue patent, No. 1,170, granted to E. W. Goodale, for improvement in machine for making paper bags and envelopes, dated April 16, 1861, in which a blank-conveyer is shown, but unlike mine in both construction and operation. In view of said patent, however, I make no claim, broadly, to this feature in an envelope-machine. The office of what are termed the "nippers" and their operating mechanism in said patented machine is to draw the blanks from the pile, thence through the machine, and deliver the same direct to folding-stand, whereas in my machine the gripping device draws the blanks back only a short distance from the picker and drops them to be further fed back toward the folding mechanism by other portions of the conveyer mechanism, as hereinbefore described. Then, again, my gripping device has continuous reciprocating movements imparted to it by its operating mechanism, while the patented device has intermittent reciprocating movements, the same being necessitated by the construction and arrangement adopted, the device being required to remain at rest after each feed-movement while the blank is being folded, owing to its traveling forward and back over the folding mechanism.

I am also aware of the United States patent to L. P. Bouvier, No. 321,183, relating to the blank-gumming mechanism of an envelope-machine, and make no claim to the construction therein shown, which consists in locating the front and back flap gum-boxes, respectively, in front of and directly over the pile of blanks, and in special mechanism for operating the gummer and picker, whereby, when the gummer is acting upon the seal-flap of the top blank, the picker holds the other edge thereof; whereas in my machine neither gum-box is located over the pile of blanks, and the top blank is held in position independent of both the gummer and picker, while the latter are operating thereon to gum both the front and back flaps thereof. It is therefore obvious that my construction and arrangement are unlike that set forth in the patent above cited.

Having described my improvements in envelope-machines, what I claim therein as new and of my invention, and desire to secure by Letters Patent, is—

1. In an envelope-machine, the gum-box 41 and its rolls located in front of and below the top of the pile of blanks, the gummer 20, having vertical movements imparted to it through the flange 35, and horizontal movements through suitable connections with carriage C, said carriage and flange 35, means, essentially as shown, for feeding up the pile of blanks, and feet, substantially as described, independent of the gummer and picker mechanism, operatively connected with carriage C, for holding the top blank in position while its front and back flaps are being gummed, in combination with the picker 50, having vertical reciprocating movements, and arranged to descend upon the back flap of the top blank to gum the same, then lift it a short distance and hold it until it is removed therefrom preparatory to being drawn forward, the gum-roll 59, having horizontal reciprocating movements under the picker to gum the bottom thereof when elevated, and the gum-box 69 and its rolls, located back of and above the pile of blanks, substantially as set forth.

2. The picker 50 and means, substantially as described, for operating the same up and down, in combination with the gum-roll 59, having hubs 70 70 of irregular shape in cross-section, said hubs being reversed in shape, and the roll mounted in suitable bearings on sliding carriages, having means, substantially as described, for imparting forward and back reciprocating movements thereto, the gum-box 69, having one or more rolls, stationary curved fingers 71 71, so arranged that when the roll 59 moves forward and back, as aforesaid, its hubs 70 70 will come in contact with and travel over the surface thereof, and thus cause irregular rotary motions to be imparted to said roll 59, substantially as and for the purpose set forth.

3. In an envelope-machine, a blank-conveyer comprising, in combination, a sliding carriage having continuous forward and back reciprocating movements imparted to it between the back-flap gumming and the folding mechanism, a hinged gripping-finger upon the front end of said carriage, arranged to grip the back edge of the blanks between its front end and the top front end of the carriage, when said finger is forced down upon said carriage, and the means described for operating the finger and carriage to produce the results herein specified.

4. In an envelope-machine, the carriage C, provided with the hooks 82 82', and with means, substantially as described, for imparting forward and back reciprocating movements thereto, in combination with the gripping-finger 74 and mechanism for operating the same, substantially as and for the purpose set forth.

5. In an envelope-machine, the blank-gripping and back-feeding mechanism, constructed and arranged to operate as described, in combination with the hooks on the carriage or conveyer of said mechanism for feeding the blanks back from the picker and depositing the same under the plunger, and the movable and rigid guide-stops arranged, respectively, back of and in front of said plunger, and adapted to adjust and hold each blank in position preparatory to its being forced down into the folder-box, substantially as set forth.

6. In an envelope-machine, the combination of the creasing-die $A^2$ and plunger 84 with adjustable stationary stops arranged in front of the creasing-die opening, movable stops arranged at the back side thereof, and means, substantially as described, for imparting forward and back reciprocating movements to said movable stops, substantially as and for the purpose set forth.

7. In an envelope-machine, a gum-roll arranged at one side of the creasing-die under one of the side flaps of the blank when the latter is in position under the plunger, and means, substantially as described, for imparting a slow rotary movement to said gum-roll in a box containing gum or other suitable adhesive substance, in combination with a compressing-head arranged over said roll, and means, substantially as described, connected with the mechanism for conveying the blanks to the folding mechanism, whereby said head is moved down upon the end of the blank to bring the latter in contact with the gum-roll at each forward movement of said conveying mechanism, substantially as and for the purpose set forth.

8. The picker or distributing roll having horizontal reciprocating movements imparted to it in the manner described, and the picker having vertical reciprocating movements, in combination with the blank conveyer or carriage provided with the gripping-finger, and mechanism for operating said carriage and finger, substantially as shown and specified.

9. The combination of the creasing-die $A^2$, provided with the adjustable stationary stops 90 90, arranged in front of its opening, with the sliding carriage or conveyer C, provided with the hooks 82', whereby the envelope-blanks are pushed over said stops 90 90 and deposited back of the same under the plunger, and their backward movements thereby controlled, substantially as and for the purpose set forth.

10. The combination of the head 92 and means, substantially as described, for imparting horizontal reciprocating movements thereto crosswise of the drying-chain between the fingers thereof, with said chain and means, substantially as described, for operating the same, whereby the envelopes are pushed laterally from between said fingers, substantially as shown and specified.

11. The combination of the head 92 and means, substantially as described, for imparting forward and back reciprocating movements thereto crosswise of the drying-chain between the fingers thereof to push the envelopes therefrom, with an envelope-receiver interposed between the point of discharging the envelopes from the drying-chain and the counting-box, said receiver having a supporting-plate which is moved forward and back by suitable means to catch the envelopes when delivered from the chain and to discharge the same therefrom into the counting-box, substantially as shown and specified.

12. The reciprocating head 92, having the finger 92' arranged to travel forward and back horizontally crosswise of the drying-chain between the fingers thereof, in combination with said drying-chain, substantially as shown, and for the purpose set forth.

ABRAM A. RHEUTAN.

Witnesses:
ALBERT A. BARKER,
WALTER B. NOURSE.